United States Patent
Selle

(10) Patent No.: US 9,751,029 B2
(45) Date of Patent: Sep. 5, 2017

(54) HEADSHAFT

(71) Applicant: Evoqua Water Technologies LLC, Warrendale, PA (US)

(72) Inventor: William H. Selle, Waukesha, WI (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 110 days.

(21) Appl. No.: 14/419,282

(22) PCT Filed: Mar. 15, 2013

(86) PCT No.: PCT/US2013/032324
§ 371 (c)(1),
(2) Date: Feb. 3, 2015

(87) PCT Pub. No.: WO2014/025408
PCT Pub. Date: Feb. 13, 2014

(65) Prior Publication Data
US 2015/0209694 A1    Jul. 30, 2015

Related U.S. Application Data

(60) Provisional application No. 61/681,191, filed on Aug. 9, 2012.

(51) Int. Cl.
| | | |
|---|---|---|
| *B01D 21/20* | (2006.01) | |
| *B01D 21/04* | (2006.01) | |
| *B29C 70/06* | (2006.01) | |
| *F16C 3/02* | (2006.01) | |

(52) U.S. Cl.
CPC ............ *B01D 21/20* (2013.01); *B01D 21/04* (2013.01); *B29C 70/06* (2013.01); *F16C 3/02* (2013.01); *Y10T 29/49826* (2015.01)

(58) Field of Classification Search
CPC ........ B01D 21/04; B01D 21/12; B01D 21/18; B01D 21/20; F16C 3/02; F16C 3/026
USPC .......... 210/523, 526, 541; 464/181; 474/161
See application file for complete search history.

(56) References Cited

U.S. PATENT DOCUMENTS

| | | | |
|---|---|---|---|
| 2,188,025 A * | 1/1940 | Weiss | B65G 17/02 474/161 |
| 4,631,974 A | 12/1986 | Wiegand et al. | |
| 4,645,598 A † | 2/1987 | Hannum | |
| 4,664,644 A * | 5/1987 | Kumata | F16C 3/026 464/181 |

(Continued)

OTHER PUBLICATIONS

Budd/Polychem sales brochure for Non-Metallic Rectangular Clarifier Components for Water and Wastewater Treatment Applications dated Sep. 1989.†

(Continued)

*Primary Examiner* — Christopher Upton

(57) ABSTRACT

Disclosed are apparatus and methods for treating wastewater. In one example there is provided a wastewater treatment system. The wastewater treatment system comprises a settling basin having a first sidewall and a second sidewall, a first headshaft mount disposed on the first sidewall, a second headshaft mount disposed on the second sidewall, a headshaft comprising a shaft extending between and engaging the first headshaft mount and the second headshaft mount and including a bull sprocket and a collector headshaft sprocket.

17 Claims, 11 Drawing Sheets

(56) References Cited

U.S. PATENT DOCUMENTS

| | | | | |
|---|---|---|---|---|
| 4,810,383 A * | 3/1989 | Hannum | ................ | B01D 21/18 |
| | | | | 210/526 |
| 4,911,610 A † | 3/1990 | Olschewski | | |
| 5,035,681 A | 7/1991 | Hertel et al. | | |
| 5,336,417 A * | 8/1994 | Hannum | ................ | B01D 21/18 |
| | | | | 210/526 |
| 5,460,727 A * | 10/1995 | Davis | ................ | B01D 21/18 |
| | | | | 210/526 |
| 5,788,837 A * | 8/1998 | Hannum | ................ | B01D 21/20 |
| | | | | 210/526 |
| 6,279,752 B1 * | 8/2001 | Hannum | ................ | B01D 21/20 |
| | | | | 210/526 |

OTHER PUBLICATIONS

Polychem Systems color brochure printed and distributed publicly in 2009 by Brentwood Industries, Inc.†

\* cited by examiner
† cited by third party

HEADSHAFT

RELATED APPLICATIONS

This application claims priority under 35 U.S.C. §119(e) to U.S. Provisional Application Ser. No. 61/681,191, titled "TUBULAR NON-METALLIC HEADSHAFT FOR RECTANGULAR COLLECTORS," filed on Aug. 9, 2012, which is herein incorporated by reference in its entirety.

BACKGROUND

1. Field of Disclosure

Aspects and embodiments disclosed herein are directed generally to wastewater treatment systems which utilize settling basins and to apparatus and methods for operating settling basins.

2. Discussion of Related Art

Chain and scraper sludge collector equipment is designed to remove settled suspended solids (sludge) from rectangular settling basins, for example, rectangular concrete settling basins, in municipal and industrial water and wastewater treatment plants. In some implementations, rectangular settling basins may be from about 10 feet (3 meters) to about 30 feet (9.1 meters) wide, from about 50 feet (15.2 meters) to about 300 feet (91.4 meters) long, and from about eight feet (2.4 meters) to about 14 feet (4.3 meters) deep. Scraper flights are often used to scrape settled material on the basin floor to a sludge withdrawal location, for example, a hopper in the settling basin. Concurrently with the removal of sludge from the basin floor, other scraper flights may be utilized to push floating material, referred to generally as "scum," from the surface of liquid in the settling basin to a scum collector for removal.

The sludge and scum removal mechanism in a settling basin often includes two endless strands of chain that run the length of the settling basin. Scraper flights that span the width of the settling basin are mounted to the chain. The chain, and the flights attached to the chain move through the settling basin to direct the sludge to the sludge withdrawal location in the floor at one end of the basin. The chain and flights are propelled by sprockets that are affixed to a headshaft that spans the width of the settling basin.

SUMMARY

In accordance with an aspect of the present disclosure there is provided a settling basin of a wastewater treatment system. The settling basin comprises first sidewall and a second sidewall, a first headshaft mount disposed on the first sidewall, a second headshaft mount disposed on the second sidewall, and a headshaft including a composite shaft extending between and engaging the first headshaft mount and the second headshaft mount.

In accordance with some embodiments the shaft is hollow and the headshaft further comprises a journal bearing disposed within the shaft proximate a first end thereof and a key slot defined in the shaft and extending partially into the first journal bearing.

In accordance with some embodiments the first headshaft mount comprises a hollow stub post disposed within a bore of the first journal bearing.

In accordance with some embodiments the shaft is a solid shaft.

In accordance with some embodiments the settling basin further comprises journal bearings disposed within recesses formed at ends of the shaft.

In accordance with some embodiments the shaft has a cross sectional area which varies along a length of the shaft.

In accordance with some embodiments the shaft includes a central section with a cross sectional area less than that of an end section of the shaft.

In accordance with another aspect of the present disclosure there is provided a headshaft for a settling basin of a wastewater treatment system. The headshaft comprises a shaft formed of a composite material and including a first end and a second end, the first end configured to engage a headshaft mount disposed on a first sidewall of the settling basin, the second end configured to engage a headshaft mount disposed on a second sidewall of the settling basin.

In accordance with another aspect of the present disclosure there is provided a method of facilitating installation of a headshaft in a settling basin of a wastewater treatment system. The method comprises providing a headshaft including a shaft formed of a composite material and including a first end and a second end, the first end configured to engage a headshaft mount disposed on a first sidewall of the settling basin, the second end configured to engage a headshaft mount disposed on a second sidewall of the settling basin.

In accordance with some embodiments the method further comprises, prior to providing the headshaft, determining a width of the settling basin and selecting a shaft having an appropriate length for installation in the settling basin.

In accordance with some embodiments the method further comprises mounting a bull sprocket and a collector headshaft sprocket on the shaft.

In accordance with some embodiments the method further comprises installing the headshaft in the settling basin.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
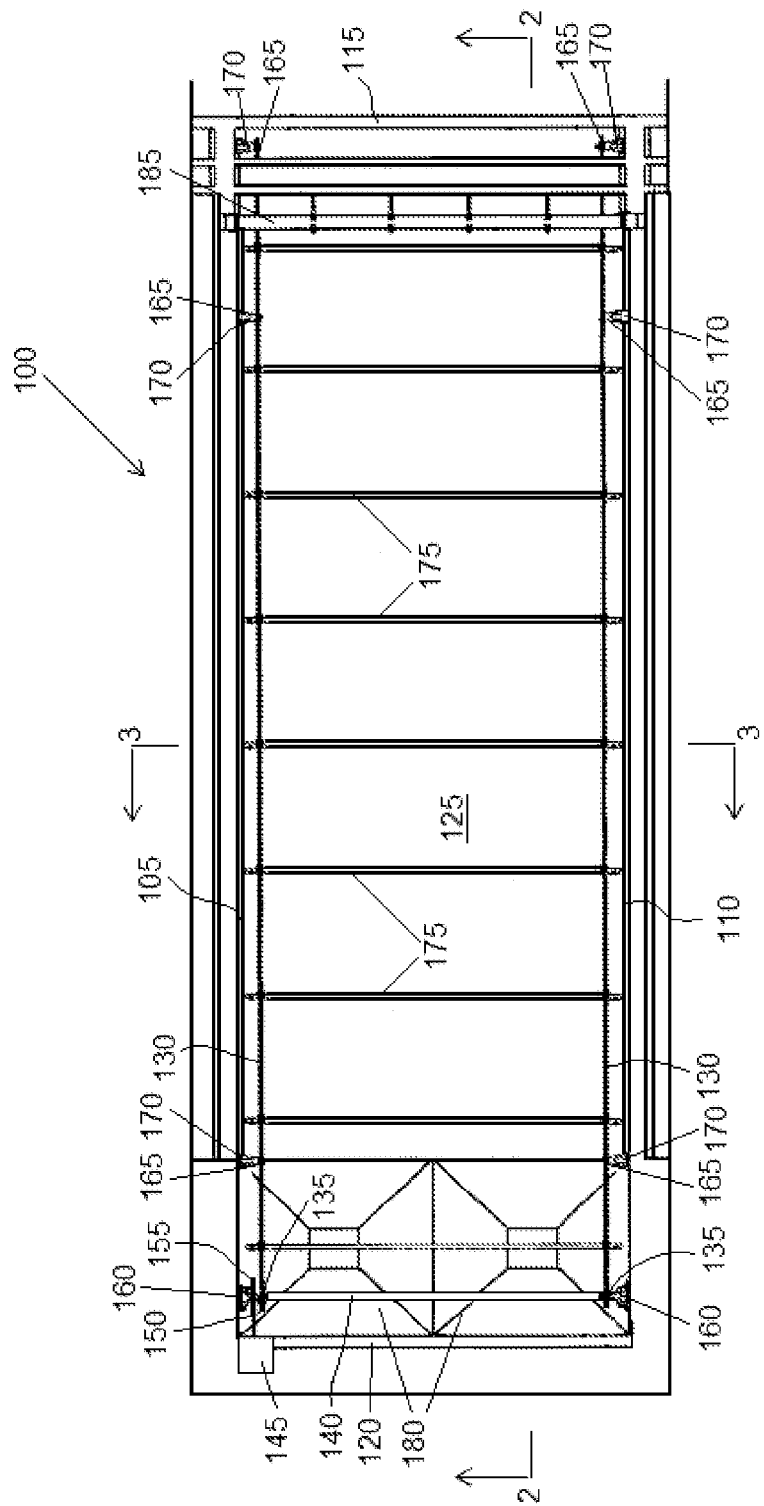
FIG. 1 is a plan view of an embodiment of a wastewater treatment plant settling basin.

Aspects and embodiments disclosed herein are not limited to the details of construction and the arrangement of components set forth in the following description or illustrated in the drawings. Aspects and embodiments disclosed herein are capable of other embodiments and of being practiced or of being carried out in various ways.

Headshafts utilized in settling basins of wastewaters treatment plants may be subjected to harsh conditions. The liquid in a settling basin may exhibit swings in pH and/or changes in temperature from day to night or from season to season. Headshafts are also subject to mechanical stresses and repetitive vibrational stress associated with driving collector chains and flights through the settling basin.

Headshafts for use in settling basins of wastewater treatment plants desirably exhibit a number of properties. The headshaft is advantageously lightweight to facilitate installation or replacement. Additionally, the headshaft should be mechanically strong along its entire length to resist deformation wider its own weight, to resist rotational moments or torques due to the forces associated with driving the collector chains and flights through the settling basin, to resist impacts which may occur during installation or servicing, and to resist stresses associated with expansion or contraction of the headshaft with changes in temperature. Further, the headshaft is desirably corrosion resistant so that it is not affected by the environment in the settling basin nor does it affect the environment due to its presence there. The selection of a material having a desirable mix of these properties is an important consideration in the design of a headshaft.

One possible material from which a headshaft may be formed is metal. Settling basin headshafts have typically been fabricated out of carbon steel or stainless steel. Since the headshaft is typically a one-piece shaft, the weight of the headshaft is often substantial, for example, from about 500 lbs. (226.8 kg) for a 20 foot (6.1 meters) shalt to about 1,000 lbs. (453.5 kg) for a 30 foot (9.1 meter) shaft. The weight of the headshafts often requires the use of strong and heavy wall bearings that are firmly secured to sidewalk of the settling basins to support the headshafts place. The weight of the headshafts often makes maintenance difficult when the headshafts are to be removed and/or replaced. When carbon steel is used, corrosion can be a problem since the shafts are normally not painted or otherwise treated for corrosion protection. If a corrosion resistant headshaft is desired, the headshaft may be constructed from stainless steel. The use of stainless steel, however, is costly due to the expense of the material and the difficulty of machining stainless steel as compared to carbon steel.

Another material from which a headshaft may be formed is engineering plastic (hereinafter, referred to as "plastic"). Plastics are typically corrosion resistant and generally lighter than most metals. Further, keyways for the attachment of drive and collector sprockets to a plastic headshaft can be either machined or molded into the shaft, which reduces the cost of construction as compared to conventional steel headshafts which require machining of the keyways. Most plastics, however, do not possess the mechanical strength desirable in a settling basin headshaft. A plastic headshaft may deform over time due to forces associated with driving the collector chains and flights through a settling basin, and in instances where a long headshaft is required, a plastic headshaft may deform under its own weight.

Headshafts may be formed of ceramic materials. Ceramics are typically corrosion resistant and strong. Ceramics, however, typically have poor impact resistance and may shatter when experiencing a sharp force or crack after being subjected to repetitive vibrational stress.

Composite materials, for example, fiber reinforced plastics or metals embedded with ceramic materials may be strong, impact resistant, corrosion resistant, and lightweight. Many composite materials may be molded, which provides for keyways for the attachment of drive and collector sprockets to a headshaft to be molded (or alternatively, machined) into the shaft, which reduces the cost of construction as compared to conventional steel headshafts which require machining of the keyways. One drawback of many composite headshafts, however, is their cost relative to headshafts formed of common metals, for example, carbon steel or many plastics. Some forms of composite, however, are not excessively expensive and may provide an acceptable tradeoff between cost and mechanical properties desirable in a headshaft that may be superior to those of pure metal, plastic, or ceramic materials.

Aspects and embodiments disclosed herein involve utilizing a headshaft including a shaft formed from a composite material (a "composite headshaft") in designs of chain and scraper sludge collector equipment in wastewater treatment plant settling basins instead of a conventional solid steel headshaft. The composite material may be a polymer matrix composite, for example, a nylon or epoxy matrix composite, a metal matrix composite, for example an aluminum or steel matrix composite, or a ceramic matrix composite, for example, a glass or alumina matrix composite. The composite material may include fibers, for example, glass, metal, carbon, or boron fibers embedded in the matrix. The composite material may include particles, for example, metal, polymer, or ceramic particles embedded in the matrix. In some embodiments, the composite is filament wound fiberglass reinforced plastic (FRP).

Aspects and embodiments disclosed herein may include a wastewater treatment system for use in a settling basin at least partially filled with wastewater. A chain-drive assembly disposed in the settling basin may include a composite headshaft extending across the width of the settling basin proximate an end of the settling basin. The composite headshaft may include a single one piece shaft sized to extend across the width of the scaling basin. The use of a single one piece shaft may be preferable to the use of a multi-piece shaft because a one piece shaft does not include joints where mechanical stresses may be concentrated and cause mechanical failure. A one piece headshaft may also include fewer parts than a multi-piece headshaft, reducing the complexity of the headshaft and reducing the number of components which might possibly fail or which may need to be inspected during maintenance procedures.

In some embodiments, the composite headshaft is supported by wall bearings or stub shafts coupled to sidewalk of the settling basin. The wall bearing or stub shaft assemblies may be fabricated from a metal, for example, steel, or from a polymer or composite material. In some embodiments, polymeric journal bearings are provided on or inside the headshaft to reduce rotational friction between the headshaft and the stub shafts and to isolate the stub shafts from fibers which may be present in a composite headshaft. The journal bearings may be made of, for example, plastic materials such as polytetrafluoroethylene (PTFE), high density polyethylene (HDPE), ultra-high molecular weight polyethylene (UHMWPE) or any plastic or other material that reduces the friction between the stub shaft and the headshaft.

The composite headshaft may include a pair of collector headshaft sprockets which engage and drive parallel drive chains. The drive chains carry flights which remove settled sludge and surface scum from the settling basin. The headshaft also includes a bull sprocket. A motor external to the settling basin drives a chain which engages the bull sprocket and drives rotation of the headshaft.

In some embodiments, the headshaft comprises a solid shaft, and in other embodiments includes a hollow shaft. A hollow shaft may be preferable to a solid shaft because a hollow shaft may be lighter than a solid shaft exhibiting comparable mechanical strength. The shaft may have a circular cross section, although embodiments of the shaft are not limited to having a circular cross section, and may instead have, for example, a square cross section. In some embodiments, the shaft may have a cross sectional area that varies along the length of the shaft. For example, in some embodiments the shaft may include a thin central portion and thicker end portions. In some embodiments the headshaft comprises a tube of a composite material.

By using a headshaft formed of a hollow tube of composite material instead of a solid steel headshaft, many benefits are realized. These include, for example, a lower fabrication cost of the composite headshaft as compared to a steel headshaft. For example, embodiments of a hollow tube headshaft formed of FRP are about 30% less expensive than a similarly sized stainless steel headshaft, reducing a settling basin system selling price by about 3%. The lower weight of the composite headshaft as compared to a steel headshaft reduces installation and maintenance costs, and, contrary to steel headshafts, no post treatment such as painting or priming as a preventive measure for corrosion control is required for embodiments of the composite headshaft, for example, embodiments formed from a polymer matrix composite. Also, headshafts formed of polymer matrix composites, for example, FRP may be easily constructed with or cut to varying lengths, which facilitates retrofitting a new headshaft onto existing equipment.

In some embodiments a keyway used to couple a sprocket to the headshaft extends completely through the headshaft tube and partially into a journal bearing disposed within the tube. The keyway houses a key which locks the sprockets onto the shaft and also keeps the plastic journal bearing and the headshaft tube joined together during rotation.

Other portions of the chain and scraper sludge collector equipment, for example, the drive and conveyor chains, the flights, the bull sprocket, collector headshaft sprockets, idler sprockets, sprocket key elements, and/or wall bearings or stub posts may be formed of metal, for example, steel. In other embodiments any one or more of these portions of the chain and scraper sludge collector equipment may be formed of a polymer or a composite material, similar to that from which the headshaft may be formed.

Illustrated in FIG. 1 is a rectangular settling basin 100 which may be utilized in a wastewater treatment plant for the settling and removal of suspended solids from wastewater undergoing treatment. The settling basin 100 includes an opposed pair of sidewalk 105, 110, a pair of end walls 115, 120, and a bottom surface 125. A pair of parallel conveyor chains 130 are driven by a headshaft 140. The conveyor chains 130 engage the headshaft through collector headshaft sprockets 135 secured to the headshaft 140 proximate opposite ends of headshaft 140. The conveyor chains 130 may also engage idler sprockets 165 which may rotate freely wall bearings or about stub posts 170 secured to the sidewalk 105, 110 of the settling basin 100.

A motor, for example, an electric motor 145 external to the settling basin 100 drives a drive chain 150 which engages a bull sprocket 155 secured to the headshaft 140 proximate an end thereof to rotate the headshaft 140. The headshaft 140 is supported by and rotates about headshaft mounts, for example, stub posts 160 secured to the sidewalk 105, 110 of the settling basin 100.

A series of sludge and scum collector flights 175 are connected at opposite ends to the conveyor chains 130. In operation, the flights 175 collect sludge from the bottom surface 125 of the settling basin 100 and direct it into sludge hoppers 180 for removal. The flights 175 also skim the top surface of liquid in the settling basin and direct floating scum into a scum collector, for example, a scum pipe assembly 185.

Figure 2:
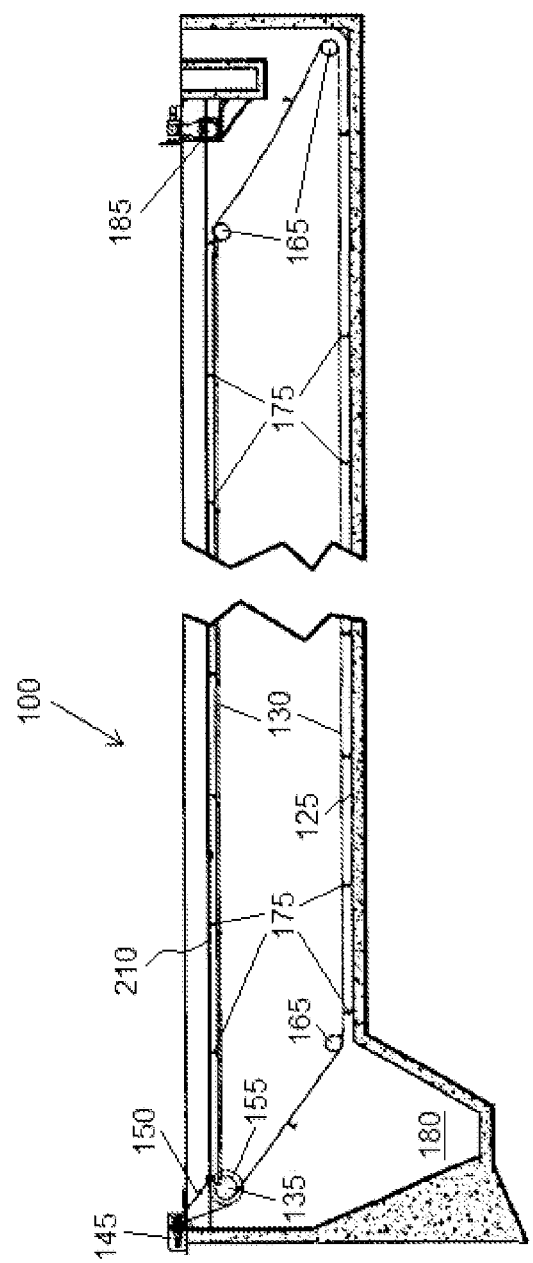
FIG. 2 is a cross sectional view of the settling basin of FIG. 1 along line 2-2 of FIG. 1.

The settling basin 100 is illustrated in cross section along line 2-2 of FIG. 1 in FIG. 2. The conveyor chain 130, as illustrated in FIG. 2, travels in a clockwise direction about the collector headshaft sprocket 135 and idler sprockets 165. The flights 175 both scrape settled sludge (not shown) from the bottom surface 125 of the settling basin 100 into the sludge hopper 180 and skim scum (not shown) from the surface 210 of liquid in the settling basin 100 and direct it to the scum pipe assembly 185.

Figure 3:
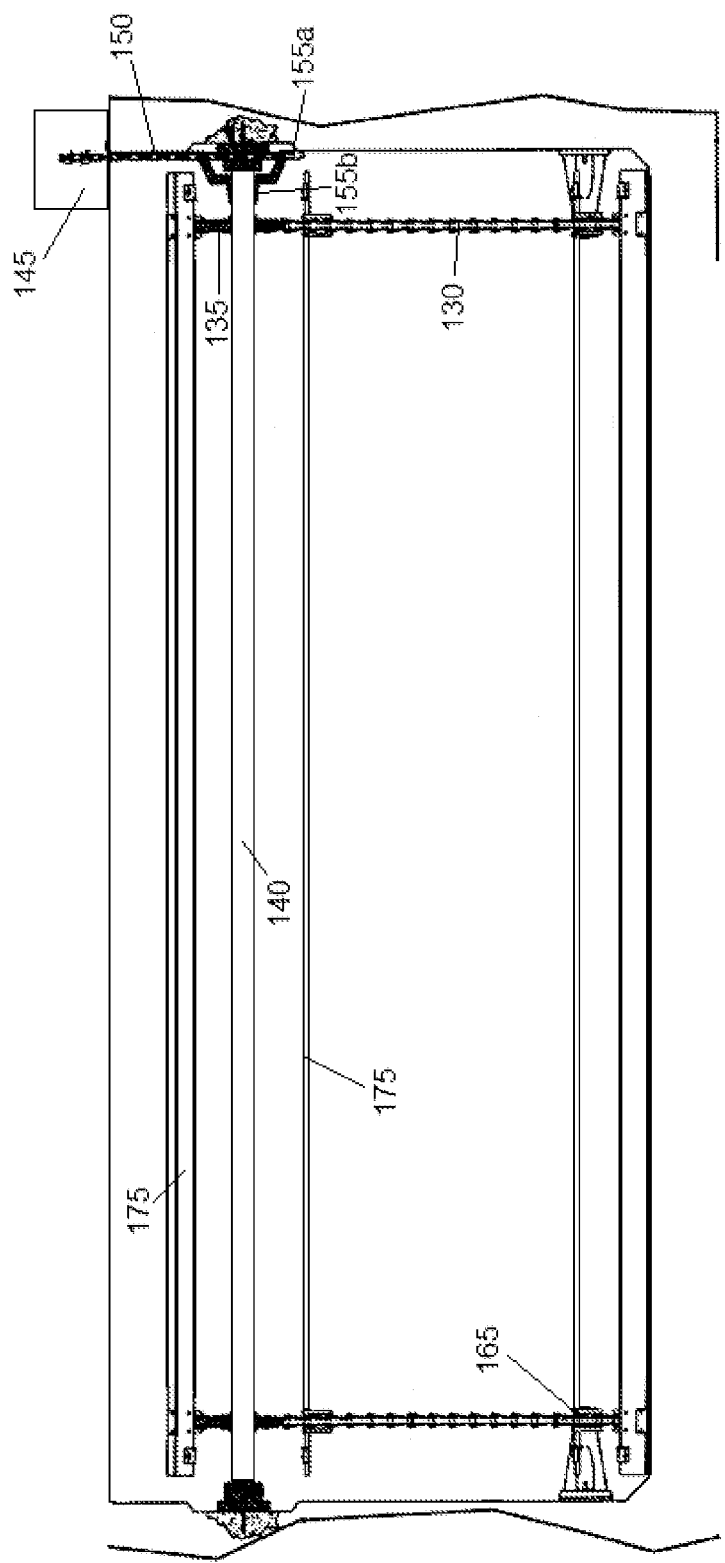
FIG. 3 is another cross sectional view of the settling basin of FIG. 1 along line 3-3 of FIG. 1.

The settling basin 100 is illustrated in cross section along line 3-3 of FIG. 1 in FIG. 3. In FIG. 3 the drive chain 150 can be seen engaging the bull sprocket 155 secured to the headshaft 140. In the embodiment illustrated in FIG. 3, the bull sprocket 155 is configured with an external tooth section 155a which engages the drive chain 150 that is horizontally displaced toward a wall of the settling basin 100 from a base portion 155b where it is connected to the headshaft 140.

Figure 4A:
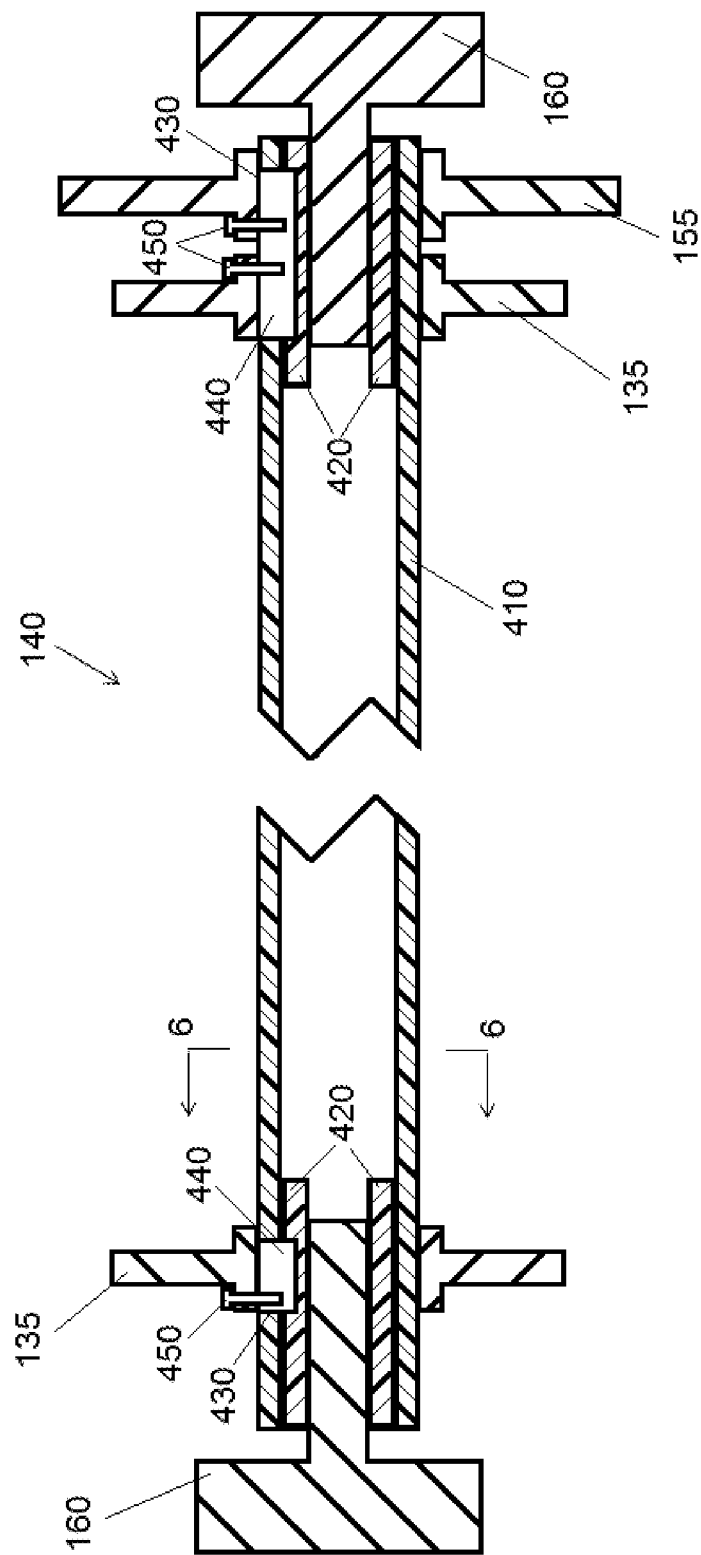
FIG. 4A is a cross sectional illustration of an embodiment of a headshaft and headshaft mounting stub shafts.

An embodiment of the headshaft 140 is illustrated in further detail in FIG. 4A. The headshaft 140 comprises an outer tube 410. The outer tube may be hollow. The outer tube 410 may be non-metallic. The outer tube 410 may be formed from a composite. The outer tube 410 may be formed from FRP. The outer tube 410 may have an outer diameter of, for example, between about 7.6 cm and about 18 cm, and a thickness of, for example, from about 0.3 cm to about 2.0 cm, although these dimensions may vary with the length of the headshaft. The length of the headshaft may vary with the width of a settling basin in which it is installed or is to be installed. Embodiments of the headshaft are not limited to having any particular outer tube wall diameter or thickness. A pair of journal bearings 420 may be disposed within the outer tube 410 proximate, for example, disposed between about 20 cm and 51 cm inside or extending from the end of the outer tube 410, or having ends flush with the ends of the outer tube 410. The journal bearings 420 may form a tight fit within the inside of the outer tube 410 or in some embodiments may have a clearance of less than about 1.0 mm within the inside of the outer tube 410. The journal bearings 420 may have a length of between about 20 cm and about 51 cm, an outer diameter of, for example, between about 6 cm and about 17 cm, and a thickness of between about 0.9 cm and about 1.4 cm, although these dimensions may vary with the length of the headshaft. Embodiments of the headshaft are not limited to having any particular dimensions for the journal bearings.

Key slots 430 may be bored through a portion of the outer tube 410. The key slots 430 may extend at least partially into the journal bearings 420. The key slots 430 may have lengths of, for example, between about 2.6 cm and about 21.0 cm, widths of, for example, between about 1.2 cm and about 3.2 cm, and depths of, for example, between about 0.6 cm and about 1.6 cm although these dimensions may vary with the length of the headshaft. Embodiments of the headshaft are not limited to having any particular dimensions for the key slots 430. The key slots 430 may alternatively be formed by molding into the outer tube 410 and/or journal bearings 420.

Key elements 440 may be disposed within the key slots 430. The key elements 440 may have lengths of for example, between about 2.5 cm and about 20.5 cm, widths of, for example, between about 1.2 cm and about 3.2 cm, and heights of for example, between about 1.2 cm and about 3.2 cm although these dimensions may vary with the length of the headshaft. Embodiments of the headshaft are not limited to having any particular dimensions for the key elements 440. The key elements 440 may be secured to the bull sprocket 155 and/or collector headshaft sprockets 135 with one or more fasteners, for example, one or more bolts 450 passing through flanges in the bull sprocket 155 and collector headshaft sprockets 135 and into the key elements 440. In some embodiments a single key element 440 secures both the bull sprocket 155 and a collector headshaft sprocket 135 to the headshaft 140. In use, the journal bearings 420 are inserted into the outer tube 410 and the sprockets 135, 155 are attached using the keys elements 440.

The stub posts 160 are inserted into bores of the journal bearings 420 and then secured to sidewalls 105, 110 of a settling basin using, for example, bolts or other fasteners (not shown), or by screwing into place in the sidewalk 105, 110. The portion of the stub posts 160 which are inserted within the journal bearings 420 may form a close fit with the internal surfaces of the journal bearings 420 while still permitting the journal bearings 420 to rotate about the stub posts 160. In some embodiments the portion of the stub posts 160 which are inserted within the journal bearings 420 may have a clearance of less than about 1.0 mm within the inside of the journal bearings 420. The portion of the stub posts 160 which are inserted within the journal bearings 420 may have diameters of for example, between about 6 cm and about 17 cm, although embodiments disclosed herein are not limited to having any particular dimensions for the stub posts 160. In some embodiments the portion of the stub posts 160 which are inserted within the journal bearings 420 may comprise hollow tubes, which may reduce the weight of the stub posts 160.

Figure 4B:
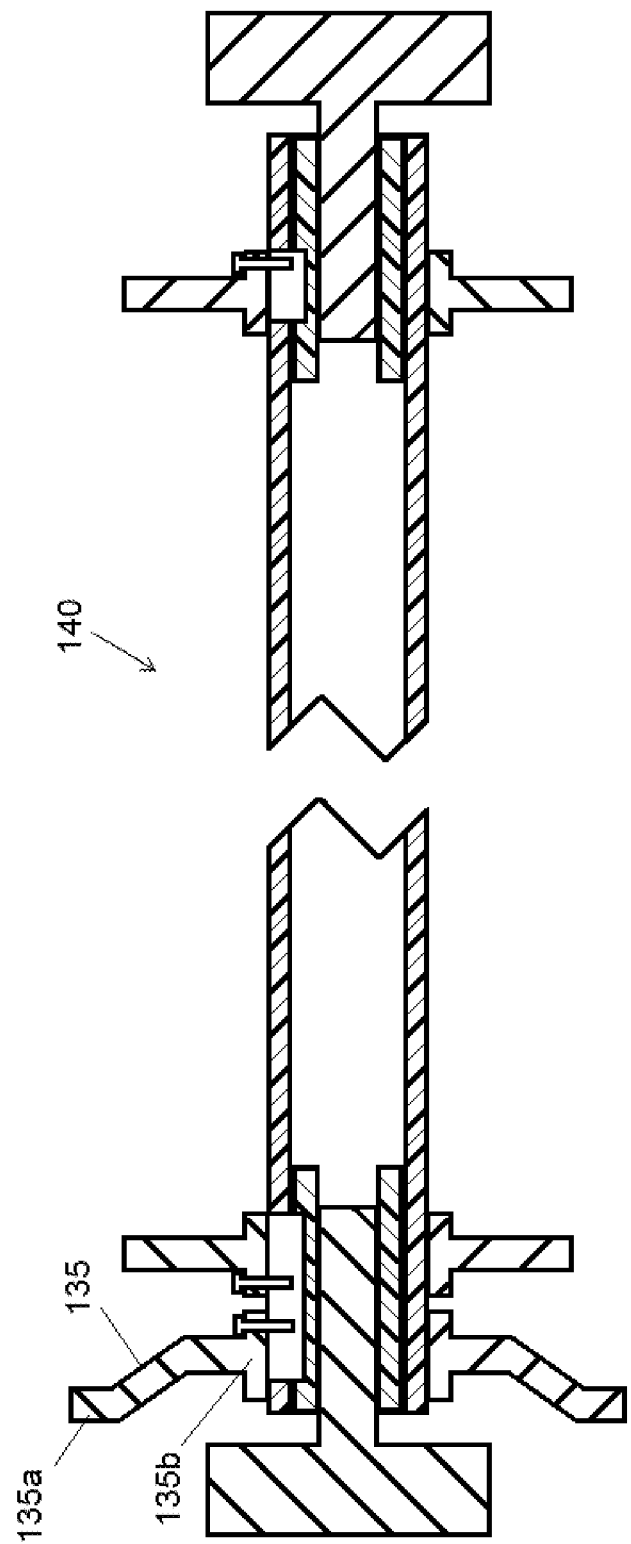
FIG. 4B is a cross sectional illustration of another embodiment of a headshaft and headshaft mounting stub shafts.

In an alternate embodiment, illustrated in FIG. 4B, the headshaft 140 includes a bull sprocket 135 with a tooth portion 135a which includes teeth configured to engage a drive chain 150 that is horizontally displaced toward the end of the headshaft 140 proximate the bull sprocket 135 from a position at which a base portion 135b of the bull sprocket is attached to the headshaft 140.

Figure 4C:
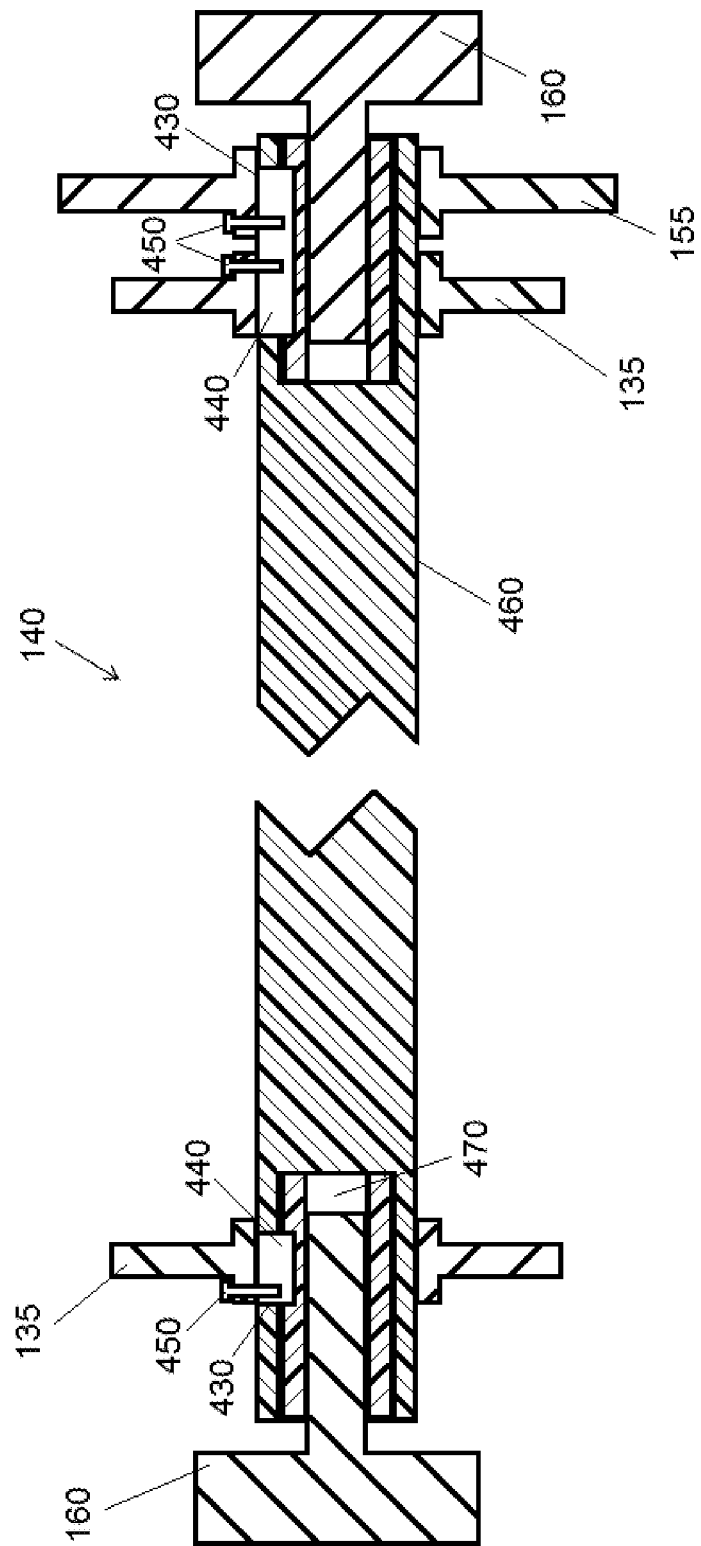
FIG. 4C is a cross sectional illustration of another embodiment of a headshaft and headshaft mounting stub shafts.

In another embodiment, illustrated in FIG. 4C, the headshaft 140 includes a solid shaft 460. In some embodiments, recesses 470 may be formed in ends of the shaft 460 to provide for journal bearings to be inserted.

Figure 4D:
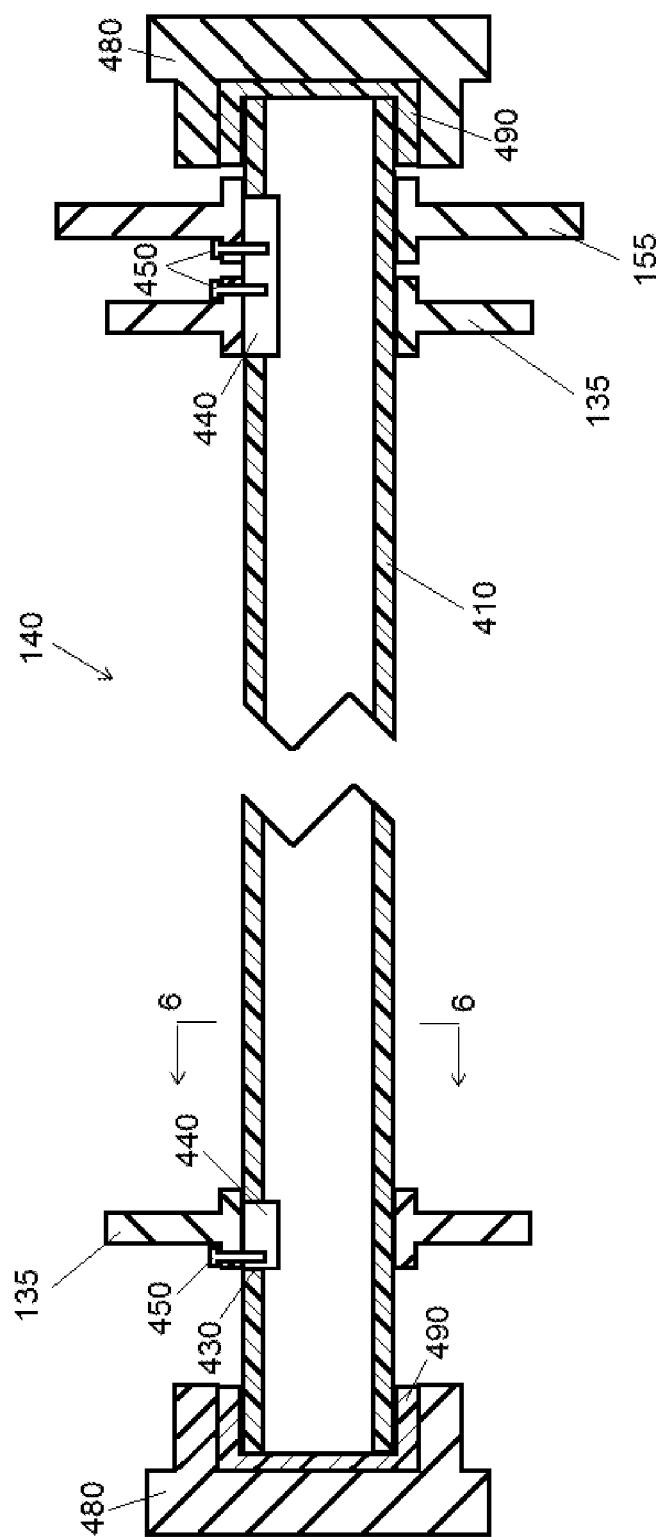
FIG. 4D is a cross sectional illustration of an embodiment of a headshaft and headshaft mounting wall bearings.

Another embodiment, illustrated in FIG. 4D, the internal journal bearings 420 may be omitted and the headshaft 140 may rotate inside apertures of headshaft mounts comprising a pair of wall bearings 480. The wall bearings 480 may include journal bearings or sleeves 490, which may be formed of a polymeric material, for example, a material similar to that which may be used to form the journal bearings 420. The sleeves 490 may reduce wear on the headshaft 410. During installation of the headshaft 140 in the settling basin 100, the outer tube 140 of the headshaft 140 may be mounted within the apertures of the wall bearings 420 and then the wall bearings may be secured to opposing first and second sidewalls of the settling basin with bolts or other connectors or fastening mechanisms known in the art. The headshaft of FIG. 4D may be hollow as illustrated, or may be a solid shaft.

Figure 4E:
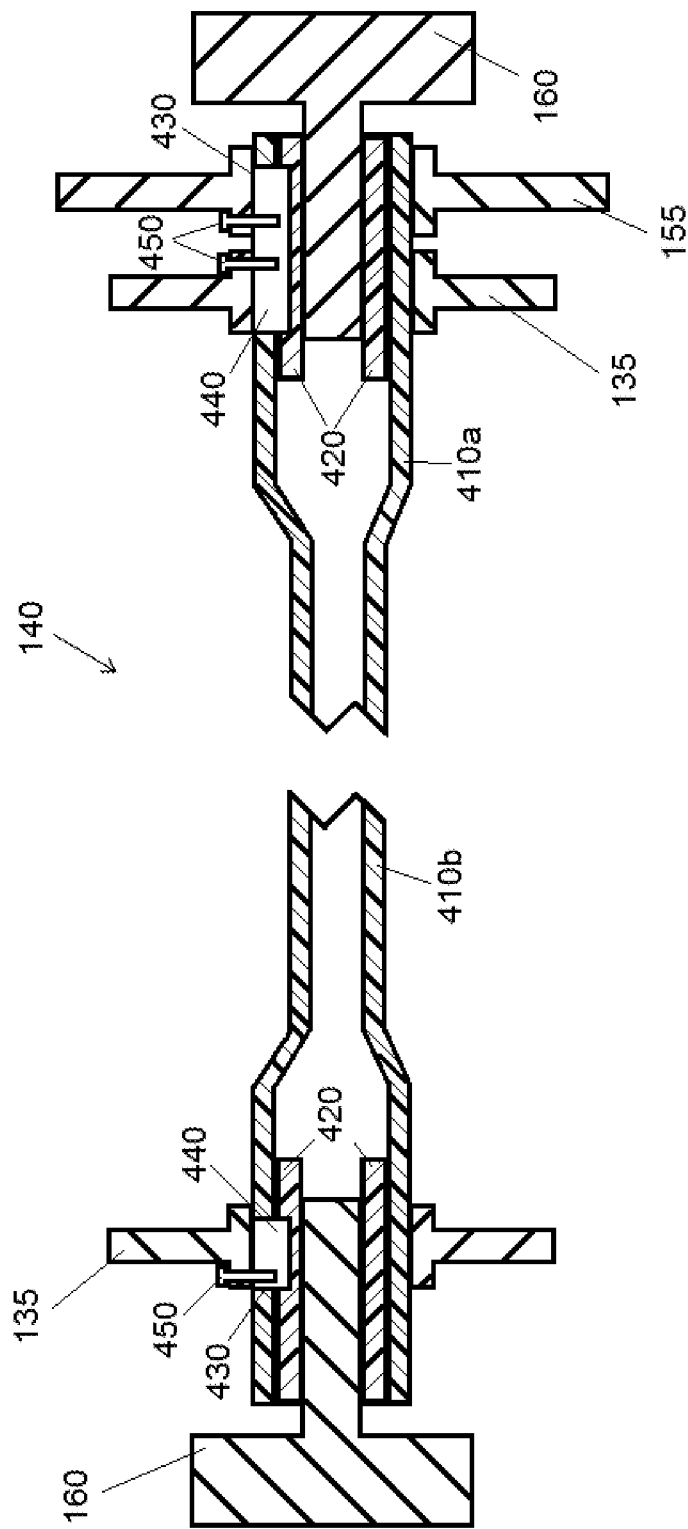
FIG. 4E is across sectional illustration of another embodiment of a headshaft and headshaft mounting stub shafts.

In some embodiments, as illustrated in FIG. 4E, the outer tube may include wide end sections 410a proximate ends of the tube, and a thinner center section 410b. The end sections 410a may be wider than the center section to accommodate the journal bearings 420 and stub shaft 160 and provide adequate space for mounting the bull sprocket 155 and collector headshaft sprockets 135. The center section 410b may have sufficient strength to transfer torque from the end of the tube including the bull sprocket 155 to the opposite end of the tube while having a smaller diameter than the end sections 410a. In some embodiments a headshaft having a cross sectional diameter which varies along its length as illustrated in FIG. 4E may include a solid shaft rather than a tubular shaft.

Figure 5:
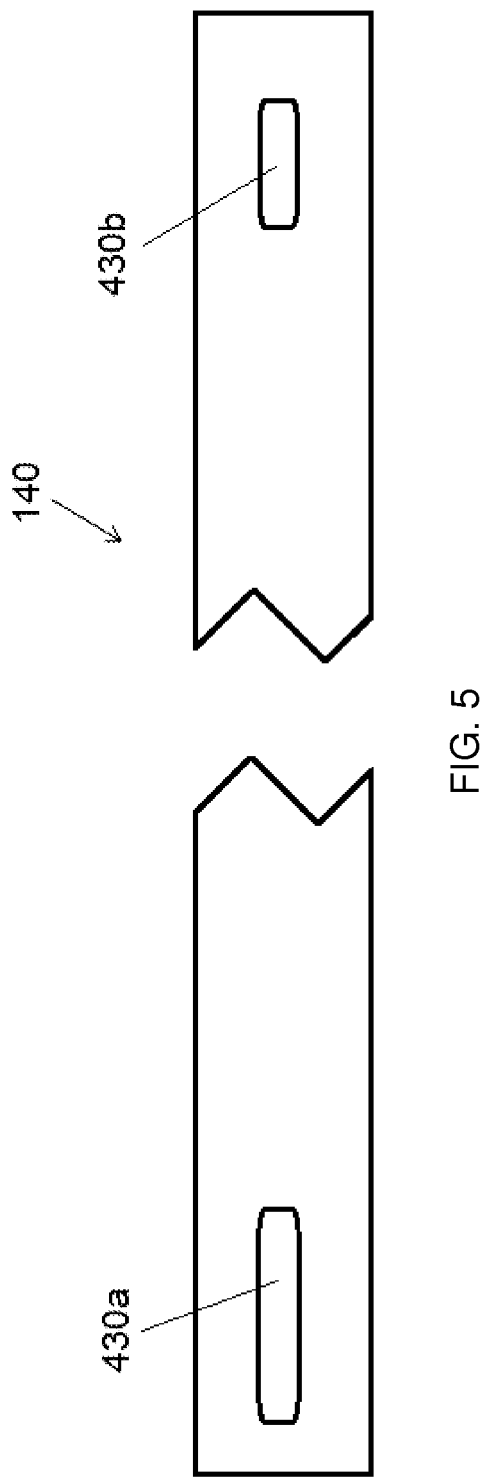
FIG. 5 is plan view of an embodiment of a headshaft.

FIG. 5 is a plan view of an embodiment of the headshaft 140 illustrating where the key slots 430 may be positioned and how they may be shaped. In this embodiment a single key slot 430a is configured to secure both a bull sprocket 155 and a first collector headshaft sprocket 135 to the headshaft 140 while a second key slot 430b is configured to secure a second collector headshaft sprocket 135 to the headshaft 140. In other embodiments, the headshaft 140 may be provided with three key slots, one for each of the bull sprocket and the two collector headshaft sprockets.

Figure 6:
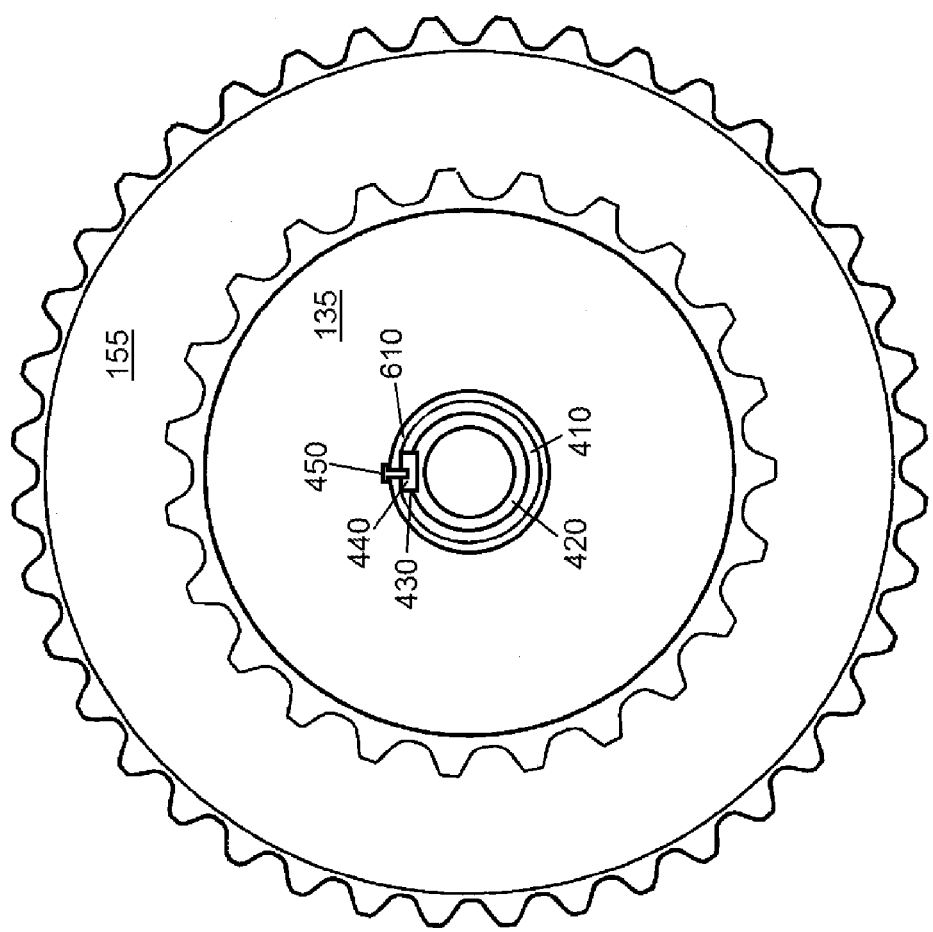
FIG. 6 is a cross sectional view of the headshaft of FIG. 4A along line 6-6 of FIG. 4A illustrating a bull sprocket and a collector headshaft sprocket.

FIG. 6 illustrates an embodiment of a bull sprocket and a collector headshaft sprocket 135 mounted to a headshaft 140 in a cross sectional view along line 6-6 of FIG. 4A. The collector headshaft sprocket 135 is secured to the headshaft 140 by a key element 440 which is disposed in a key slot 430 extending through the outer tube 410 and a portion of a journal bearing 420. The key element 440 is secured to the collector headshaft sprocket 135 by a bolt 450 passing through a flange 610 of the collector headshaft sprocket 135 and into the key element 440. The bull sprocket 155 is secured to the headshaft 140 with a similar arrangement, which is not visible in FIG. 6.

Figure 7:
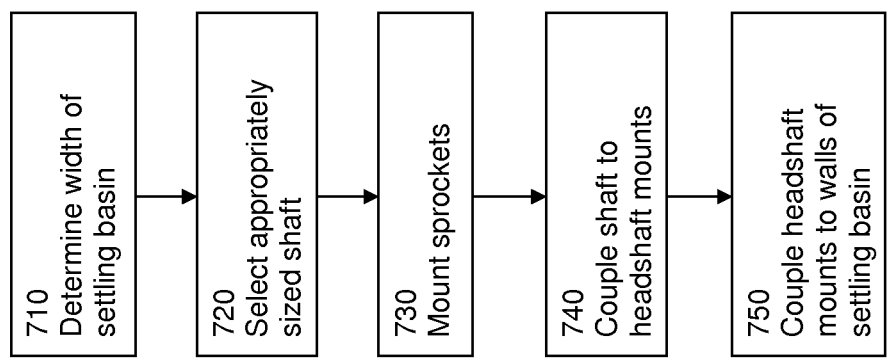
FIG. 7 is a flowchart of a method of installing a headshaft in a settling basin.
Figure 7:

A method 700 for installing embodiments of the headshaft disclosed herein in a settling basin of a wastewater treatment facility is illustrated in FIG. 7. The method may include determining the width of the settling basin (act 710) and selecting a shaft having a length appropriate for mounting within the width of the settling basin (act 720). In some embodiments, the shaft may be cut to an appropriate size. The method may further include mounting the bull sprocket and collector headshaft sprockets on the shaft (act 730). Key elements 440 disposed within key slots 430 may be used to secure the bull and collector headshaft sprockets to the shaft. The shaft may then be coupled to headshaft mounts (act 740), for example, stub posts which may be inserted into each end of the shaft or into journal bearings disposed within each end of the shaft when the shaft comprises a hollow tube 410. The headshaft mounts may then be secured to opposing sidewalk of the settling basin (act 750). A drive chain and/or conveyor chains may be coupled to the bull sprocket and collector headshaft sprockets, respectively, either before or after the headshaft mounts are secured to the sidewalk of the settling basin.

Example:

A headshaft in accordance with an embodiment disclosed herein was fabricated and installed in a settling basin of a wastewater treatment plant. The headshaft was formed from FRP tube and incorporated plastic end bearings, collector headshaft sprockets and bull sprocket. The headshaft had a length of 6.9 m with a 13 cm outer diameter and 0.6 cm wall thickness and weighed about 45 kg.

The headshaft was installed in a settling basin having a width of 6.0 m and a length of 28 m length. The settling basin was used for treating secondary sludge. The contractor who installed the headshaft reported the installation took approximately one hour (including mounting the stub posts to the tank side walls), and that the headshaft assembly was put in place without the need of an overhead or jib crane.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. For example, although aspects of the present disclosure are described as used to remove biological floc from wastewater, these aspects may be equally applicable to the removal of any form of suspended solids, for example, inorganic suspended solids or fats, oil, or grease in a settling unit or vessel. Aspects of the wastewater treatment systems described herein may also use non-biological treatment methods rather than biological treatment methods for the treatment of wastewater. Accordingly, the foregoing description and drawings are by way of example only.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A settling basin of a wastewater treatment system, the settling basin comprising:
   a first sidewall and a second sidewall;
   a first headshaft mount disposed on the first sidewall;
   a second headshaft mount disposed on the second sidewall;
   a single piece headshaft including a composite shaft extending between and engaging the first headshaft mount and the second headshaft mount, a journal bearing disposed within the shaft proximate a first end thereof, and a key slot defined in the shaft, the key slot extending only partially into the journal bearing and extending between a bull sprocket and a collector headshaft sprocket mounted on the shaft; and
   a single key element configured to be retained in the key slot and to secure both the bull sprocket and the collector headshaft sprocket to the headshaft.

2. The settling basin of claim 1, wherein the shaft is hollow.

3. The settling basin of claim 2, wherein the first headshaft mount comprises a hollow stub post disposed within a bore of the journal bearing.

4. The settling basin of claim 3, wherein the journal bearing is in direct contact with the hollow stub post.

5. The settling basin of claim 1, wherein the shaft is a solid shaft.

6. The settling basin of claim 5, further comprising journal bearings disposed within recesses formed at ends of the shaft.

7. The settling basin of claim 1, wherein the shaft has a cross sectional area which varies along a length of the shaft.

8. The settling basin of claim 7, wherein the shaft includes a central section with a cross sectional area less than that of an end section of the shaft.

9. The settling basin of claim 1, wherein the composite shaft comprises a polymer matrix composite with one of metal particles, polymer particles, or ceramic particles embedded in a polymer matrix.

10. The settling basin of claim 1, wherein the composite shaft comprises a nylon matrix composite.

11. The settling basin of claim 1, wherein the single key element is disposed within the key slot.

12. The settling basin of claim 11, further comprising a first fastener passing through a flange in the bull sprocket into the single key element and a second fastener passing through a flange in the collector headshaft sprocket into the single key element.

13. A headshaft for a settling basin of a wastewater treatment system, the headshaft comprising a single piece shaft formed of a composite material and including a first end and a second end, the first end configured to engage a headshaft mount disposed on a first sidewall of the settling basin, the second end configured to engage a headshaft mount disposed on a second sidewall of the settling basin, the headshaft further comprising a journal bearing disposed within the shaft proximate the first end a key slot defined in the shaft, the key slot extending only partially into the first journal bearing and extending between a bull sprocket and a collector headshaft sprocket mounted on the shaft, and a single key element configured to be retained in the key slot and to secure both the bull sprocket and the collector headshaft sprocket to the headshaft.

14. A method of facilitating installation of a headshaft in a settling basin of a wastewater treatment system, the method comprising:
   measuring the width of the settling basin;
   selecting a headshaft having a length appropriate for mounting within the width of the settling basin;
   providing the headshaft including a single piece shaft formed of a composite material and including a first end and a second end, the first end configured to engage a headshaft mount disposed on a first sidewall of the settling basin, the second end configured to engage a headshaft mount disposed on a second sidewall of the settling basin, the headshaft further comprising a journal bearing disposed within the shaft proximate the first end a key slot defined in the shaft, the key slot extending only partially into the first journal bearing and extending between a space for mounting a bull sprocket and a space for mounting a collector headshaft on the shaft, and a single key element configured to be retained in the key slot and to secure both the bull sprocket and the collector headshaft sprocket to the headshaft.

15. The method of claim 14, further comprising mounting the bull sprocket and the collector headshaft sprocket on the shaft.

16. The method of claim 15, further comprising installing the headshaft in the settling basin.

17. The method of claim 15, comprising mounting both the bull sprocket and the collector headshaft sprocket on the shaft with the single key element.

* * * * *